United States Patent
Zeng et al.

(10) Patent No.: US 11,405,453 B2
(45) Date of Patent: Aug. 2, 2022

(54) METHODS AND APPARATUSES FOR TRANSMITTING MESSAGES

(71) Applicant: ALIPAY (HANGZHOU) INFORMATION TECHNOLOGY CO., LTD., Zhejiang (CN)

(72) Inventors: Chao Zeng, Hangzhou (CN); Jiang Wang, Hangzhou (CN); He Sun, Hangzhou (CN); Fuxi Deng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,712

(22) Filed: Jun. 30, 2021

(65) Prior Publication Data

US 2021/0329068 A1 Oct. 21, 2021

(30) Foreign Application Priority Data

Sep. 25, 2020 (CN) .......................... 202011021691.5

(51) Int. Cl.
*H04L 67/10* (2022.01)
*H04L 45/64* (2022.01)
(Continued)

(52) U.S. Cl.
CPC ............ *H04L 67/108* (2013.01); *H04L 51/18* (2013.01)

(58) Field of Classification Search
CPC ..... G06F 16/2379; G06F 16/27; H04L 45/64; H04L 67/108; H04L 51/18;
(Continued)

(56) References Cited

U.S. PATENT DOCUMENTS 10,417,217 B2  9/2019  Pierce et al.
10,757,084 B1  8/2020  Yu
(Continued)

FOREIGN PATENT DOCUMENTS

CN  1599350    3/2005
CN  102769889  11/2012
(Continued)

OTHER PUBLICATIONS bitcoinfibre.org [online], "FIBRE," available no later than Jul. 2016, retrieved on Aug. 24, 2021, retrieved from URL<https://bitcoinfibre.org/>, 4 pages.
(Continued)

*Primary Examiner* — Soe Hlaing
(74) *Attorney, Agent, or Firm* — Fish & Richardson P.C.

(57) ABSTRACT

One or more embodiments of this specification provide methods and apparatuses for transmitting messages. A method includes: registering, based on a registration request sent by each blockchain node in a blockchain relay communication network, a blockchain node to a blockchain node set indicated by the registration request; determining, in response to receiving a blockchain message to be sent to a target blockchain node set, a target blockchain node registered to the target blockchain node set and a target relay node in the blockchain relay communication network; and transmitting the blockchain message to the target blockchain node through the target relay node.

20 Claims, 7 Drawing Sheets

(51) Int. Cl.
    *H04L 51/18*     (2022.01)
    *H04L 67/1074*     (2022.01)

(58) Field of Classification Search
    CPC ............. H04L 2209/38; H04L 67/1093; H04L 67/1046; H04L 67/1053; H04L 51/00; H04L 25/20; H04L 45/48; H04L 67/10
    See application file for complete search history.

(56) References Cited

U.S. PATENT DOCUMENTS

| | | | |
|---|---|---|---|
| 2009/0073921 | A1 | 3/2009 | Ji et al. |
| 2014/0022902 | A1 | 1/2014 | Uppunda et al. |
| 2017/0352027 | A1 | 12/2017 | Zhang et al. |
| 2018/0212970 | A1 | 7/2018 | Chen et al. |
| 2019/0082007 | A1 | 3/2019 | Klarman et al. |
| 2020/0076610 | A1* | 3/2020 | Wang ..................... H04L 45/64 |
| 2020/0177572 | A1 | 6/2020 | Qui |
| 2021/0004297 | A1* | 1/2021 | Scrivner ............. G06F 16/2379 |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 107231299 | 10/2017 |
| CN | 107800795 | 3/2018 |
| CN | 107846718 | 3/2018 |
| CN | 108829749 | 11/2018 |
| CN | 109039847 | 12/2018 |
| CN | 109462505 | 3/2019 |
| CN | 109635165 | 4/2019 |
| CN | 109639550 | 4/2019 |
| CN | 109784881 | 5/2019 |
| CN | 109996306 | 7/2019 |
| CN | 110445882 | 11/2019 |
| CN | 110474846 | 11/2019 |
| CN | 110602201 | 12/2019 |
| CN | 110650189 | 1/2020 |
| CN | 110737664 | 1/2020 |
| CN | 110741400 | 1/2020 |
| CN | 110751475 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111522833 | 8/2020 |
| KR | 20180129028 | 12/2018 |
| WO | WO2018212756 | 11/2018 |
| WO | WO2018231255 | 12/2018 |
| WO | WO2019159045 | 8/2019 |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21179717.0, dated Nov. 23, 2021, 9 pages.

* cited by examiner

METHODS AND APPARATUSES FOR TRANSMITTING MESSAGES

CROSS-REFERENCE TO RELATED APPLICATIONS

This application claims priority to Chinese Patent Application No. 202011021691.5, filed on Sep. 25, 2020, which is hereby incorporated by reference in its entirety.

TECHNICAL FIELD

One or more embodiments of this specification relate to the field of the blockchain technology, and in particular, to methods and apparatuses for transmitting messages.

BACKGROUND

The blockchain technology (also referred to as the distributed ledger technology) is a decentralized distributed database technology, featured by being decentralized, open, transparent, immutable, trustworthy, and the like, and is suitable for many application scenarios with high needs on data reliability.

SUMMARY

In view of this, one or more embodiments of this specification provide methods and apparatuses for transmitting messages.

To achieve the previously described objective, one or more embodiments of this specification provide the following technical solutions.

According to a first aspect of one or more embodiments of this specification, a method of transmitting messages applied to a relay node in a blockchain relay communication network is provided. The method includes: registering, based on a registration request submitted by each blockchain node, the blockchain node to a blockchain node set indicated by the registration request; determining, when receiving a blockchain message sent for a target blockchain node set, a target blockchain node registered to the target blockchain node set and a target relay node in the blockchain relay communication network and connected to the target blockchain node; and transmitting the blockchain message to the target blockchain node through the target relay node.

According to a second aspect of the one or more embodiments of this specification, an apparatus for transmitting messages applied to a relay node in a blockchain relay communication network is provided. The apparatus includes: a registration unit, configured to register, based on a registration request submitted by each blockchain node, the blockchain node to a blockchain node set indicated by the registration request; a determining unit, configured to determine, when receiving a blockchain message sent for a target blockchain node set, a target blockchain node registered to the target blockchain node set and a target relay node in the blockchain relay communication network and connected to the target blockchain node; and a transmission unit, configured to transmit the blockchain message to the target blockchain node through the target relay node.

According to a third aspect of the one or more embodiments of this specification, an electronic device is provided, including: a processor; and a memory, configured to store processor executable instructions, where the processor executes the executable instructions to implement the method according to the first aspect.

According to a fourth aspect of the one or more embodiments of this specification, a computer-readable storage medium is provided to store computer instructions, where the instructions are executed by a processor to implement steps of the method in the first aspect.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The embodiments described in the following explanatory embodiments are not all the embodiments consistent with one or more embodiments of this specification, but are instead only examples of apparatuses and methods that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
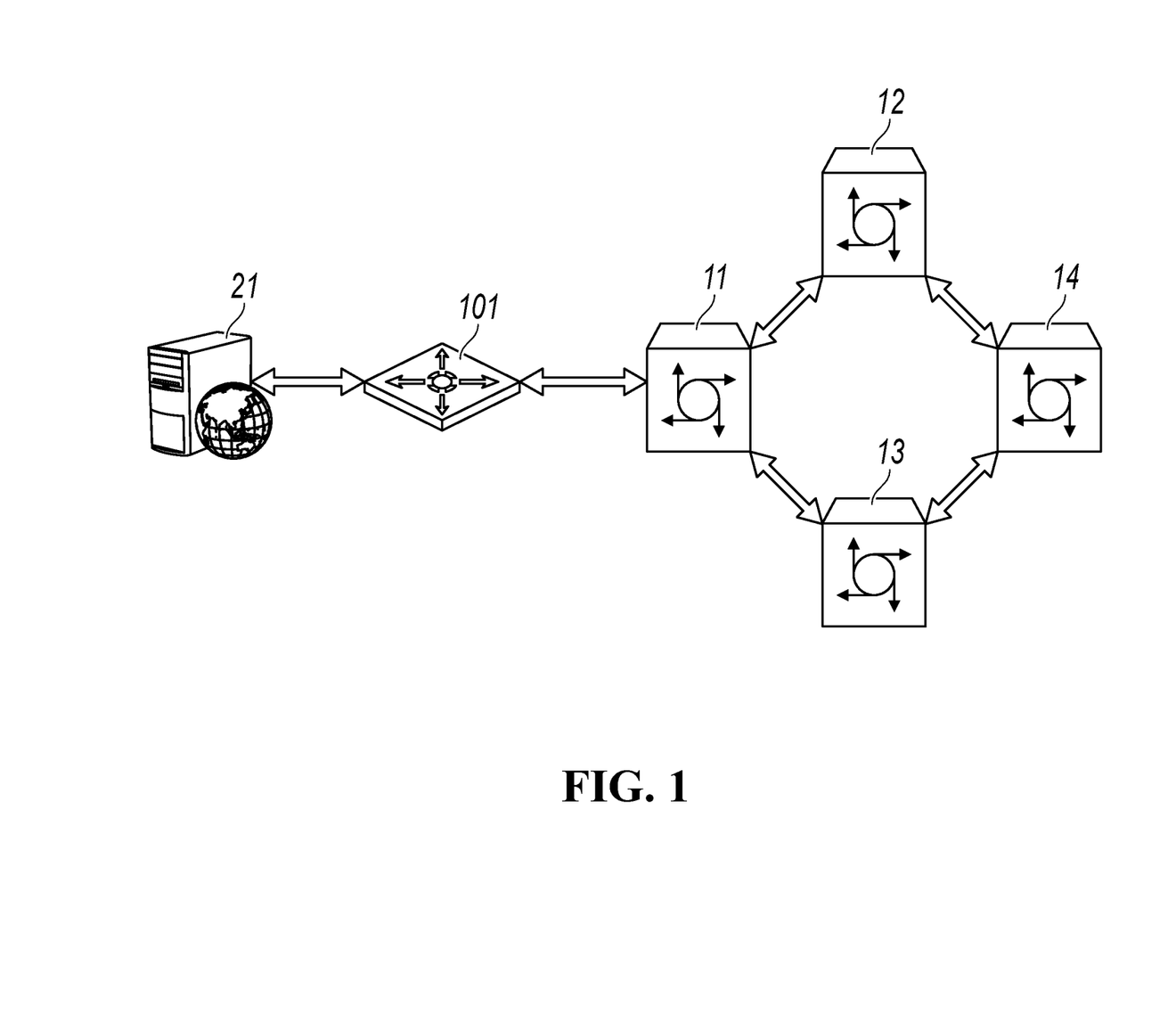
FIG. 1 is a schematic diagram showing interaction between a blockchain node and a blockchain relay communication network, according to an explanatory embodiment.

FIG. 1 is a schematic diagram showing interaction between a blockchain node and a blockchain relay communication network, according to an explanatory embodiment. As shown in FIG. 1, it is assumed that a blockchain relay communication network includes a plurality of relay nodes such as a relay 11, a relay 12, a relay 13, and a relay 14. Taking the relay 11 as an example, the relay 11 can be connected to a node 21 in a blockchain network through a gateway 101. Similarly, other relay node(s) can also be connected to other blockchain node(s) in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can be communicated with the gateway 101 through a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or another device independent of the relay 11 and the node 21, which is not limited in this specification.

The blockchain network includes a plurality of blockchain nodes, and communication operations such as consensus, transaction transmission, and block synchronization are expected to be implemented between the blockchain nodes. In the related art, a peer-to-peer (P2P) technology is directly used for communication between the blockchain nodes to transmit transactions, blocks, or the like, but due to various network factors, a communication delay is high and a stability is poor, which cannot meet application needs. Therefore, similar to the node 21, each blockchain node can access the relay nodes in the blockchain relay communication network respectively. In this way, the blockchain nodes can communicate with each other through the blockchain relay communication network. As the blockchain relay communication network is a backbone relay communication network for real-time transmission of blockchains, the relay nodes can communicate and interact with each other through a high quality bandwidth guaranteed by high QoS. Therefore, the blockchain relay communication network takes over an intermediate link of communication between the blockchain nodes, which can reduce the communication delay and improve the stability, thus significantly improving a communication quality between the blockchain nodes.

The blockchain relay communication network can be applied to various types of blockchain networks, including a public chain, a private chain, a consortium chain, or the like. For example, the blockchain relay communication networks applied to the public chains mainly include Falcon, Fast Bitcoin Relay Network (FBRN), Fast Internet Bitcoin Relay Engine (FIBRE), or the like, and the blockchain relay communication networks applied to the consortium chains mainly include BloXRoute, Blockchain Transmission Network (BTN), or the like. However, the blockchain relay communication networks in the related art can only play a relay role in the communication process between the blockchain nodes, and have no essential difference from a P2P transmission mechanism adopted when no blockchain relay communication network is used.

Figure 2:
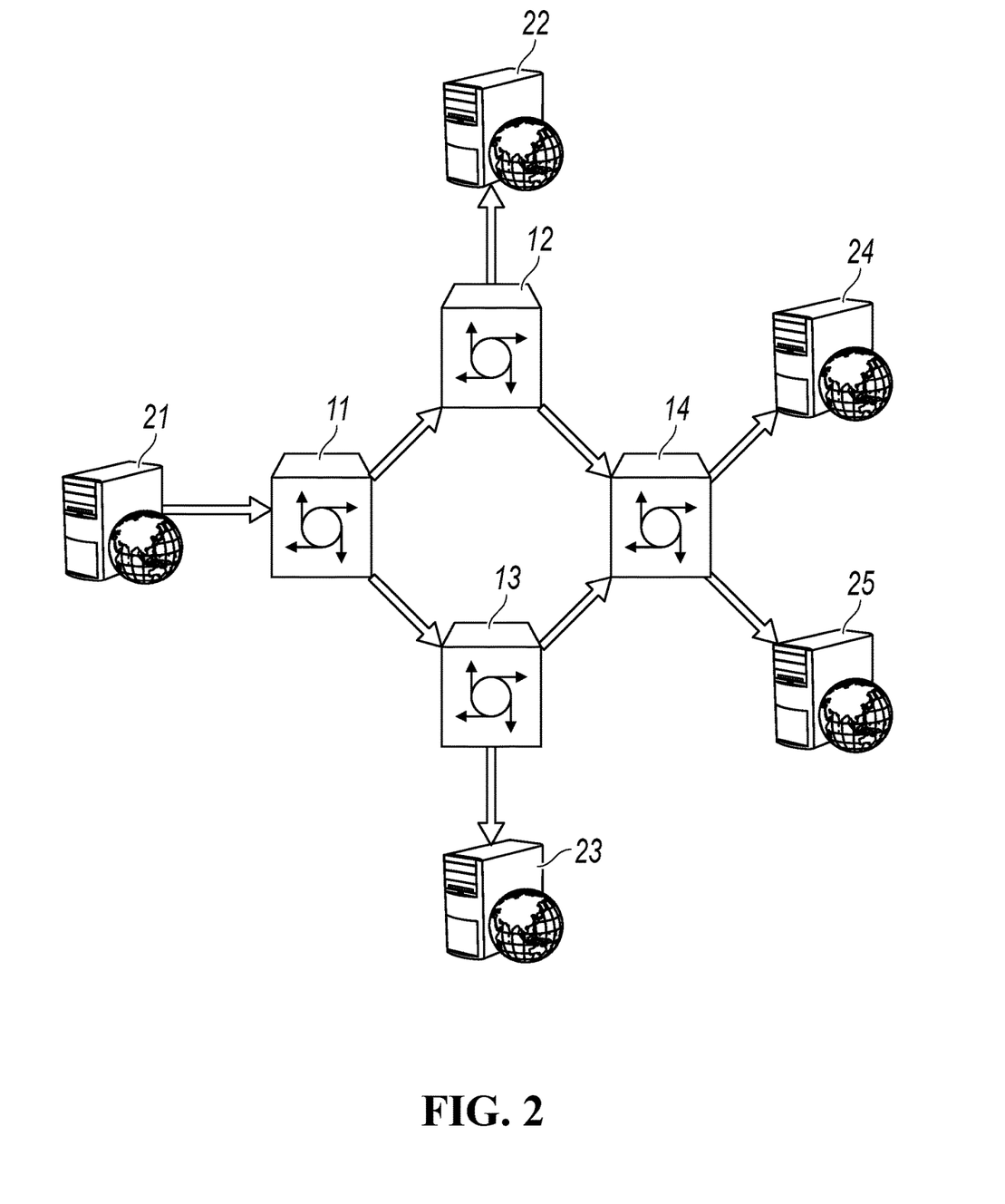
FIG. 2 is a schematic diagram of a message transmission scenario, according to an explanatory embodiment.

Take a message transmission scenario shown in FIG. 2 as an example. It is assumed that the node 21 in the blockchain network is connected to the relay 11 in the blockchain relay communication network, a node 22 is connected to the relay 12, a node 23 is connected to the relay 13, and nodes 24 to 25 are connected to the relay 14. To facilitate understanding, the previously described gateway (such as the gateway 101) is omitted herein. When the node 21 is expected to send a message to the node 22 and the node 24, the node 21 first sends the message to the relay 11, and the relay 11 forwards the message to the relay 12 and the relay 13 separately. The relay 12 forwards the message to the node 22 on one hand and forwards the message to the relay 14 on the other hand. The relay 13 forwards the message to the node 23 on one hand and forwards the message to the relay 14 on the other hand. The relay 14 forwards the message to the node 24 and the node 25. Consequently, the message from the node 21 is received by the node 22 and the node 24, and also received by the node 23 and the node 25. Moreover, the operation of forwarding the message to node 25 by the relay 14, the operation of forwarding the message to the relay 13 by the relay 11, and the operation of separately forwarding the message to the relay 14 and the node 23 by the relay 13 are not necessary. These operations cause a waste of communication resources.

To save the communication resources and realize a more efficient communication process through the blockchain relay communication network, this specification provides a new solution of transmitting messages.

Figure 3:
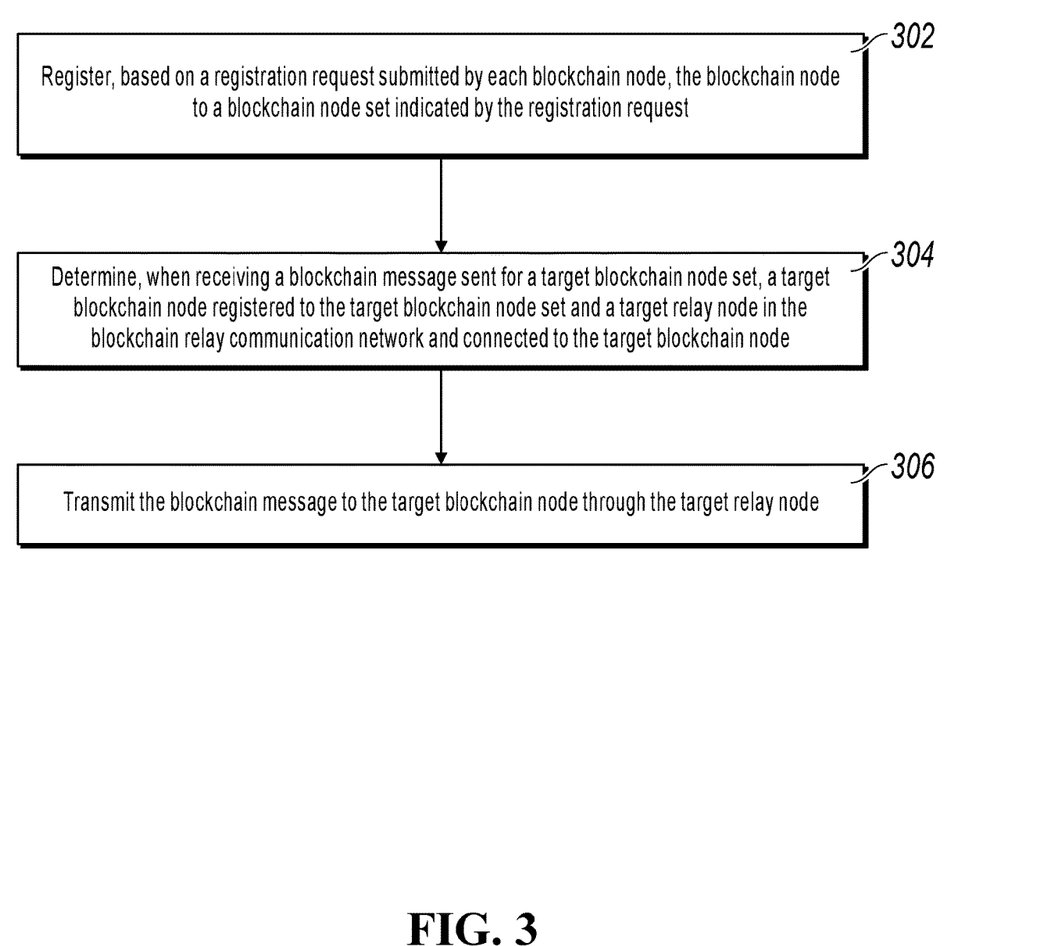
FIG. 3 is a flowchart of a method of transmitting messages, according to an explanatory embodiment.

FIG. 3 is a flowchart of a method of transmitting messages according to an explanatory embodiment. As shown in FIG. 3, the method is applied to a relay node in a blockchain relay communication network. The method can include the following steps.

Step 302: register, based on a registration request submitted by each blockchain node, the blockchain node to a blockchain node set indicated by the registration request.

The blockchain relay communication network can be layered on a control plane and a data plane, and a forwarding control policy of network data can be separated from a data transmission process, so that the forwarding control policy can be freely defined, and the data transmission can be more universal and efficient. For the blockchain relay communication network, the control plane can be understood as a message routing policy, and the data plane refers to transmission of a blockchain message in the blockchain relay communication network. By submitting the registration request, the blockchain node can freely configure a blockchain node set to which the blockchain node pertains according to application (or service) needs, so as to adjust a message routing related to the blockchain node.

Through the previously described methods, the transmission process of the blockchain message in the blockchain relay communication network is optimized. Still taking the nodes 21 to 25 as an example, it is assumed that the node 21 wants to send a blockchain message to the node 22 and the node 24. If the node 22 and the node 24 are added to the same blockchain node set by sending registration requests in advance, the node 21 only needs to mark a target object of the blockchain message as the blockchain node set, to ensure that the blockchain relay communication network only sends the blockchain message to the node 22 and the node 24 that pertain to the blockchain node set. For example, the node 21 sends the blockchain message to the relay 11, the relay 11 forwards the blockchain message to the relay 12, the relay 12 forwards the blockchain message to the node 22 and the relay 14 separately, and the relay 14 forwards the blockchain message to the node 24, thus avoiding sending the blockchain message to other relay nodes and blockchain nodes to avoid a waste of the communication resources. The transmission process of the blockchain message in the blockchain relay communication network is described in detail below.

If the registration request includes a set identifier, the relay node can register the blockchain node initiating the registration request to a blockchain node set corresponding to the set identifier. If the blockchain node set corresponding to the set identifier is created in advance, the blockchain node is added to the blockchain node set; if the blockchain node set corresponding to the set identifier is not created in advance, then it is equivalent to creating the blockchain node set and adding the blockchain node to the blockchain node set.

If the registration request does not include a set identifier, the relay node can register the blockchain node initiating the registration request to a default blockchain node set. The default blockchain node set can include all blockchain nodes in the blockchain network to which the blockchain node initiating the registration request pertains; or, the default blockchain node set can be other predefined blockchain node set(s), depending on a predefined policy adopted by the blockchain relay communication network.

When the blockchain node is not added to any blockchain node set, a corresponding routing policy of the blockchain node in the blockchain relay communication network only involves a node ID of the blockchain node and a relay ID of a relay node connected to the blockchain node. For example, a routing policy corresponding to the node 21 in FIG. 2 is "node 21-relay 11", and a routing policy corresponding to the node 22 is "node 22-relay 12", or the like. After the blockchain node is added to the blockchain node set, information related to the blockchain node set is added to the routing policy corresponding to the blockchain node in the blockchain relay communication network. For example, when the node 21 is added to a blockchain node set SID1, the routing policy corresponding to the node 21 can be updated from the "node 21-relay 11" to "SID1/node 21-relay 11", indicating that the node 21 pertains to the blockchain node set SID1.

Figure 4:
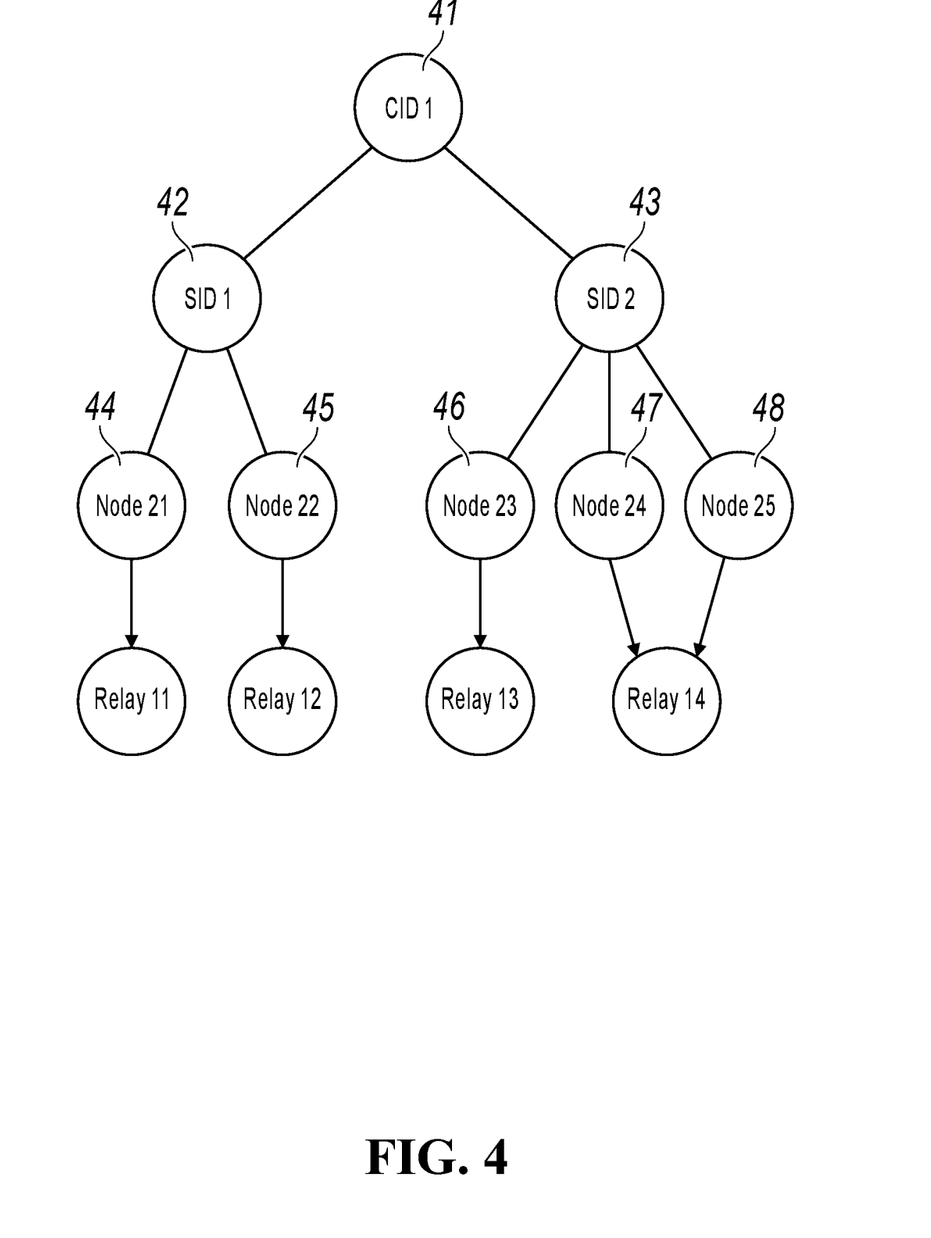
FIG. 4 is a schematic diagram of a tree-like routing table, according to an explanatory embodiment.

There may be a hierarchical relationship between the blockchain node sets. Based on the hierarchical relationship, the blockchain node set to which the blockchain node pertains, and a connection relationship between the blockchain nodes and the relay nodes, the routing policies corresponding to each blockchain node in the blockchain relay communication network can be formed into a tree-like structure, that is, a tree-like routing table. For example, as shown in FIG. 4, it is assumed that the node 21 and the node 22 both pertain to the blockchain node set SID1, the node 23, the node 24, and the node 25 all pertain to a blockchain node set SID2, and the blockchain node set SID1 and the blockchain node set SID2 both pertain to a blockchain node set CID1 (therefore, the nodes 21 to 25 actually pertain to the blockchain node set CID1). Therefore, the blockchain node set CID1 corresponds to a root node 41 in the tree-like routing table, the blockchain node set SID1 and the blockchain node set SID2 respectively correspond to child nodes 42 to 43 of the root node 41 in the tree-like routing table, the node 21 and the node 22 respectively correspond to child nodes 44 to 45 of the node 42 in the tree-like routing table, the node 23, the node 24 and the node 25 respectively correspond to child nodes 46 to 48 of the node 43 in the tree-like routing table, and the nodes 44 to 48 are leaf nodes of the tree-like routing table. Moreover, values of these leaf nodes are relay IDs of connected relay nodes. For example, the node 21 is connected to the relay 11, so the value of the leaf node 44 is the relay 11, and so on.

Certainly, the tree-like routing table shown in FIG. 4 shows routing relationships in a logical level, and the relay node usually adopts other forms when actually recording the routing relationships. For example, for each blockchain node, a relay node can generate a routing policy corresponding to the blockchain node based on a path from the root node to the leaf node corresponding to the blockchain node, and separate adjacent nodes with a predefined separator, so the routing policy corresponding to the node 21 can be CID1/SID1/Node1:tn1, where Node1 indicates a node ID of the node 21 and tn1 indicates a relay ID of the relay 11. Similarly, the routing policy corresponding to the node 23 can be CID1/SID2/Node3:tn3, where Node3 indicates a node ID of the node 23, tn3 indicates a relay ID of the relay 13, and so on.

By describing the nodes on the whole path where the blockchain nodes are located in the routing policy, a set identifier of a low-hierarchy blockchain node set can be more flexible. For example, on the basis of the blockchain node sets SID1 and SID2, a next hierarchy of blockchain node sets are further included, such as a blockchain node set 1 pertaining to the blockchain node set SID1 and a blockchain node set 2 pertaining to the blockchain node set SID2, so even if the blockchain node set 1 and the blockchain node set 2 adopt the same set identifier, the two sets can also be distinguished by a difference between the blockchain node set SID1 and SID2.

The same blockchain node can be added to one or more blockchain node sets based on application needs. That is, blockchain nodes included in different blockchain node sets may overlap. For example, a blockchain node set C1 can include the node 21, the node 22, and the node 23, and a blockchain node set C2 can include the node 22, the node 23, the node 24, and the node 25, so the node 22 and the node 23 pertain to the two blockchain node sets C1 and C2 at the same time.

In the previously described registration process, the blockchain node set indicated by the registration request is irrelevant to other blockchain node set(s). For example, when the registration request indicates the blockchain node set SID1 shown in FIG. 4, the blockchain node set SID2 is the other blockchain node set irrelevant to the blockchain node set. Certainly, "irrelevant" here mainly means that there is no hierarchical relationship between the blockchain node sets, but it does not mean that there is no correlation between the two at all. For example, the blockchain node set SID1 and the blockchain node set SID2 are actually subsets of the blockchain node set CID1, which can also be regarded as a correlation between the two. The blockchain node set indicated by the registration request can be included in one or more other blockchain node sets. For example, when the registration request indicates the blockchain node set SID1 shown in FIG. 4, the blockchain node set SID1 is included in the blockchain node set CID1, that is, the blockchain node set SID1 is a subset of the blockchain node set CID1. The blockchain node set indicated by the registration request can include one or more other blockchain node sets. For example, when the registration request indicates the blockchain node set CID1 shown in FIG. 4, the blockchain node set CID1 includes the blockchain node set SID1 and the blockchain node set SID2, that is, both the blockchain node set SID1 and the blockchain node set SID2 are subsets of the blockchain node set CID1.

Step 304: determine, when receiving a blockchain message sent for a target blockchain node set, a target blockchain node registered to the target blockchain node set and a target relay node in the blockchain relay communication network and connected to the target blockchain node.

The relay node can receive the blockchain message sent for the target blockchain node set from a connected blockchain node, and transmit the blockchain message based on the technical solutions of this specification. For example, the relay node forwards the blockchain message to the target relay node only, but not to other relay nodes. Certainly, the relay node can also receive the blockchain message for the target blockchain node set from other relay node(s) in the blockchain relay communication network. In this case, the relay node may be one of the target relay nodes, or the relay node may not be the target relay node, but it is expected to forward the blockchain message to the target relay node via the relay node. For example, in the embodiment shown in FIG. 2, it is assumed that the node 21 wants to send a blockchain message to a target blockchain node set, and a member of the target blockchain node set is the node 24: the relay 11 first receives the blockchain message from the node 21, and determines that the target relay node is the relay 14 connected to the node 24, and a route forwarding path between the relay 11 and the relay 14 is "relay 11-relay 12-relay 14", so the relay 11 transmits the blockchain message to the relay 12. After receiving the blockchain message, the relay 12 finds that the target relay node is the relay 14, so the relay 12 forwards the blockchain message to the relay 14. After receiving the blockchain message, the relay 14 finds that the target relay node is the relay 14 and the target blockchain node is the node 24, so the relay 14 forwards the blockchain message to the node 24.

A blockchain node can indicate a target blockchain node set by adding a set identifier to a blockchain message. Correspondingly, after receiving the blockchain message, a relay node can read the set identifier from the blockchain message and determine a blockchain node set corresponding to the set identifier as the target blockchain node set corresponding to the blockchain message. If the tree-like routing table previously described is adopted, the set identifier included in the blockchain message preferably includes information of all the blockchain node sets in the corresponding path of the target blockchain node. For example, for the node 21 in FIG. 4, the set identifier included in a blockchain message can be expressed as "CID1/SID1". In this way, even if there is another "CID2/SID1", the set identifier can be clearly distinguished. Certainly, a set identifier included in a blockchain message can alternatively include only the set identifier of the target blockchain node set as long as the set identifier of each blockchain node set at all hierarchies can be ensured to be unique. For example, the "CID1/SID1" is adjusted to "SIM".

Figure 5:
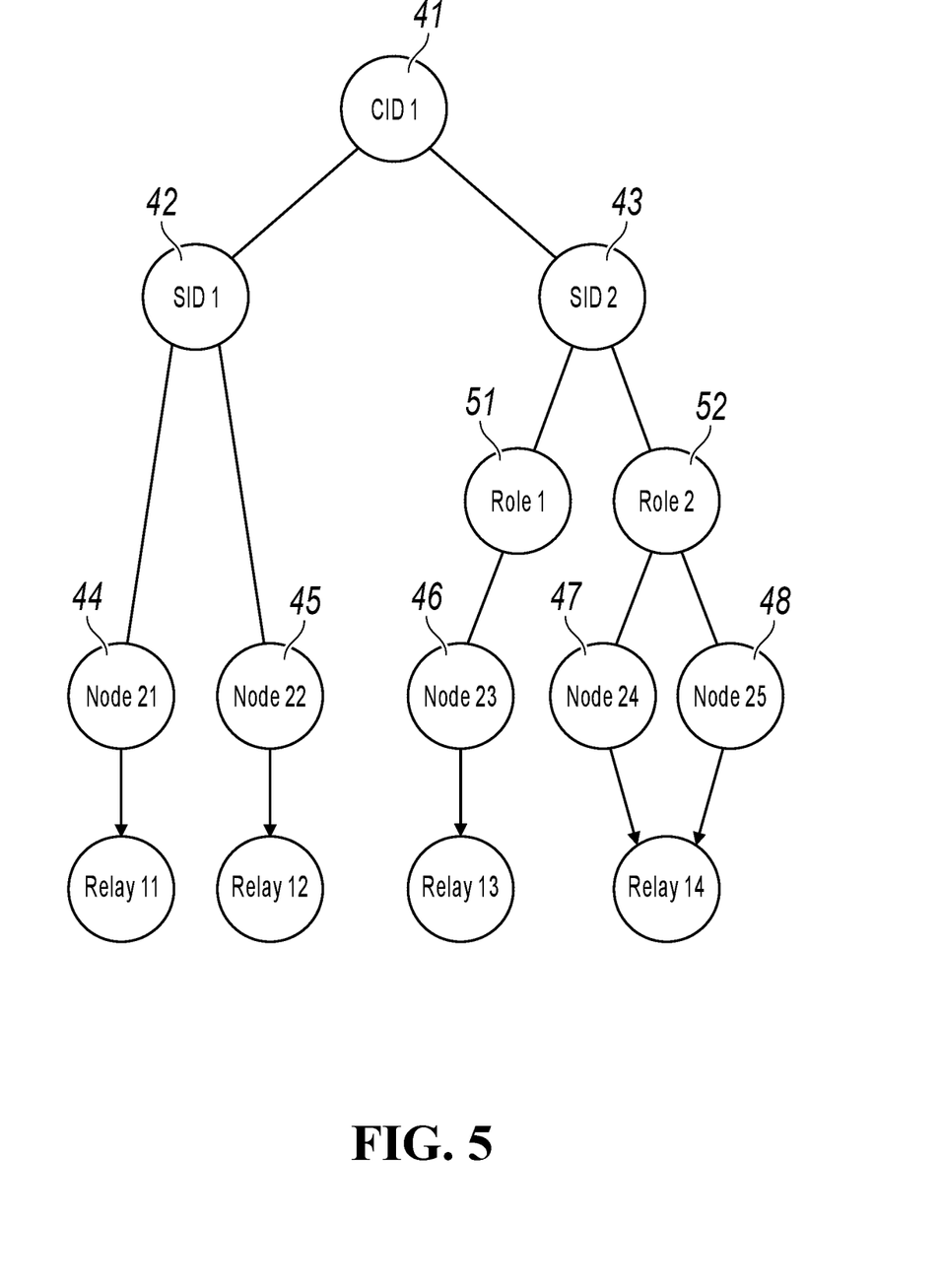
FIG. 5 is a schematic diagram of a tree-like routing table combined with role types according to an explanatory embodiment.

In addition to classifying the blockchain nodes into each blockchain node set, the blockchain nodes included in the blockchain node set can be further classified to achieve finer-grained routing configuration and message transmission. For example, the blockchain nodes included in the blockchain node set can be classified into a plurality of role types, such as consensus nodes, ledger nodes, and other role types based on different functions implemented by the blockchain nodes, or different role types based application needs or other dimensions, which is not limited in this specification. A registration request initiated by a blockchain node can include role type information, and a relay node can record a role type corresponding to each blockchain node in the blockchain node set, and record the role type of each blockchain node in the blockchain node set into a corresponding routing policy. Taking the tree-like routing table as an example, it is assumed that a role 1 and a role 2 are divided from the blockchain node set SID2, the tree-like routing table shown in FIG. 4 can be updated as that shown in FIG. 5: a new hierarchy can be added below the node 43 corresponding to the blockchain node set SID2, and the hierarchy includes a node 51 corresponding to the role 1 and a node 52 corresponding to the role 2. If the blockchain node 23 pertains to the role 1 and the blockchain nodes 47 to 48 pertain to the role 2, the node 46 corresponding to the blockchain node 23 can be used as a child node of the node 51, and the nodes 47 to 48 corresponding to the blockchain nodes 24 to 25 can be used as child nodes of the node 52. Moreover, the routing policy corresponding to the blockchain node 23 can be updated to CID1/SID2/Role1/Node3: tn3, where Role1 represents the role 1, Node3 indicates a node ID of the blockchain node 23, and tn3 indicates a relay ID of the relay 13. Similarly, the routing policy corresponding to the blockchain node 24 can be updated to CID1/SID2/Role2/Node4:tn4, where Role2 represents the role 2, Node4 indicates a node ID of the blockchain node 24, and tn4 indicates a relay ID of the relay 14.

Correspondingly, in a case of considering the role type, in addition to indicating the target blockchain node set in the blockchain message, the blockchain node is further expected to indicate a target role type in the blockchain message. After receiving the blockchain message, the relay node can read the target role type indicated in the blockchain message and use the blockchain node registered to the target blockchain node set and corresponding to the target role type as the target blockchain node. However, a blockchain node registered to the target blockchain node set but not corresponding to the target role type cannot receive the blockchain message.

As previously described, the relay node can generate a routing table for recording the blockchain node set to which each blockchain node pertains and a connection relationship between each blockchain node and the relay nodes. For example, the tree-like routing table or a routing table in other form(s) can be used as the routing table. Correspondingly, the relay node can determine, by querying the routing table, the target blockchain node registered to the target blockchain node set (all the blockchain nodes registered to the target blockchain node set, or the blockchain nodes registered to the target blockchain node set and corresponding to the target role type), and the target relay nodes in the blockchain relay communication network and connected to the target blockchain node, so as to transmit the blockchain message to each target blockchain node through the target relay node.

There may be a large number of routing policies in the routing table. If the relay node matches the blockchain message in the full routing policies every time, too much time may be taken. Therefore, the relay nodes in the blockchain relay communication network can be classified into a plurality of relay sets, and the relay nodes in each relay set maintain two routing tables: a set routing table and a full routing table. The full routing table is used for recording routing policies formed by the registration requests received by all the relay nodes in the blockchain relay communication network. Moreover, each relay set has different set routing tables, and each set routing table is used for recording a routing policy formed by the registration requests directly received by the relay nodes in the corresponding relay set from the connected blockchain nodes. Therefore, two hierarchies of routing tables are maintained by each relay node: after receiving the blockchain message, the relay node first matches in the set routing table maintained by the relay node. If the target relay node can be determined, it is not necessary to use the full routing table. If the target relay node cannot be determined or cannot be fully determined, the relay node further matches in the full routing table to determine the target relay node.

In addition to the two-hierarchy routing formed by the set routing table and the full routing table, other forms can be adopted. For example, a relay node can maintain a set routing table corresponding to a relay set in which the relay node is located and a supplementary routing table corresponding to the set routing table, where a union of the set routing table and the supplementary routing table is the full routing table. After receiving the blockchain message, the relay node first matches in the set routing table maintained by the relay node. If the target relay node can be determined, it is not necessary to use the supplementary routing table. If the target relay node cannot be determined or cannot be determined fully, the relay node matches in the supplementary routing table, which can avoid repeated matching of the routing policies in the set routing table as compared with matching in the full routing table.

Figure 6:
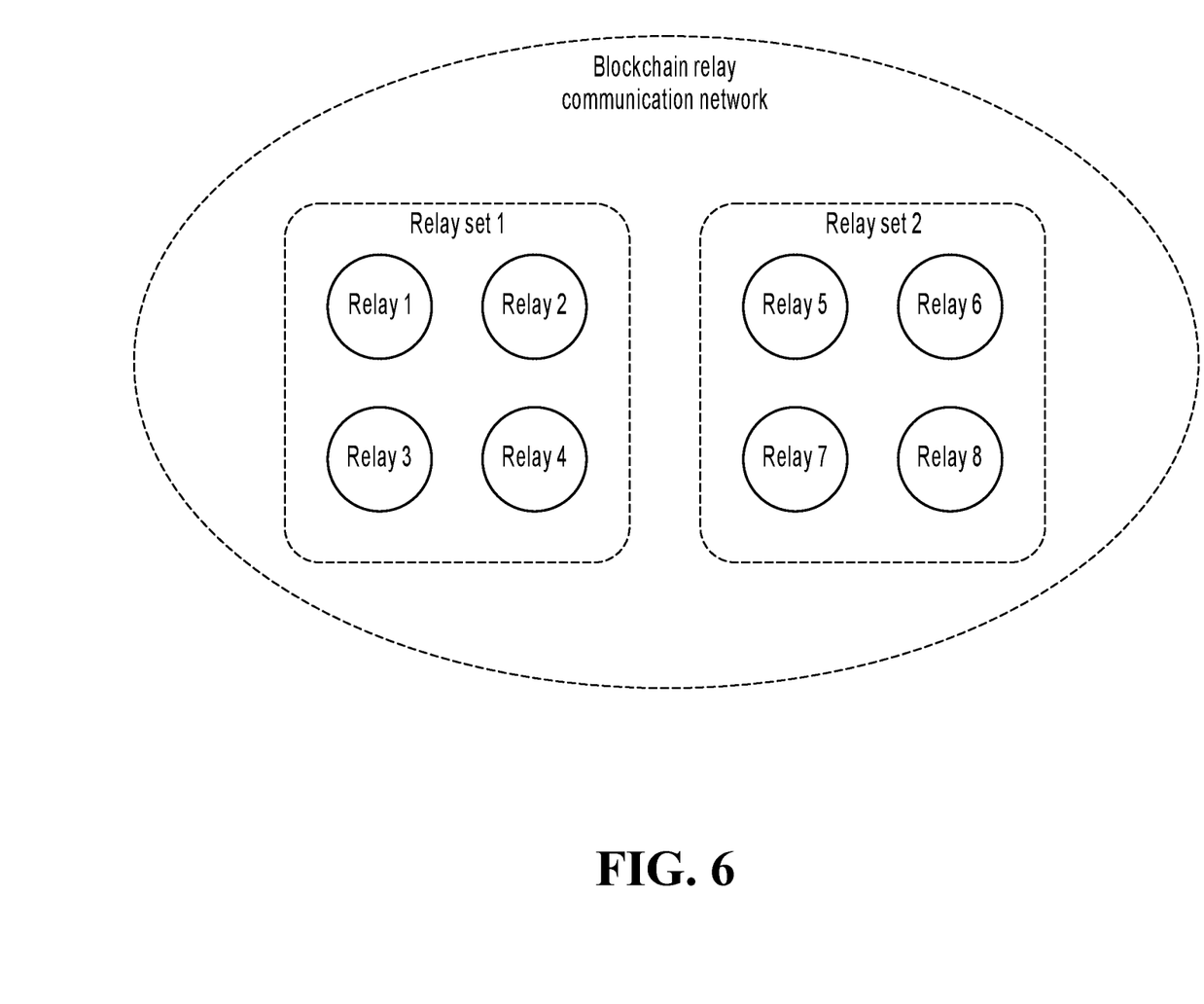
FIG. 6 is a schematic diagram of dividing relay nodes into sets, according to an explanatory embodiment.

For example, as shown in FIG. 6, it is assumed that the blockchain relay communication network includes eight relay nodes, respectively, a relay 1 to a relay 8, where the relay 1 to the relay 4 are classified into a relay set 1 and the relay 5 to the relay 8 are classified into a relay set 2. The relay 1 to the relay 8 are connected to the corresponding blockchain nodes respectively. Each relay node can receive the registration request initiated by the blockchain node connected to the relay node, and can share the registration request or the routing policy generated based on the registration request with other relay nodes, finally ensuring that each relay node can know all the routing policies. It is assumed that each relay node generates a routing policy after receiving the registration request initiated by the blockchain node connected to the relay node and shares the routing policy with other relay nodes, then each relay node can form the routing policies generated by the relay node and shared by other relay nodes into the full routing table, and form the routing policies generated by the relay node and shared by other relay nodes in the relay set in which the relay node is located into the set routing table. For example, the relay 1 to the relay 4 each can form the routing policies generated by the relay 1 to the relay 4 into a set routing table 1, the relay 5 to the relay 8 each can form the routing policies generated by the relay 5 to the relay 8 into a set routing table 2, and the relay 1 to the relay 8 each can form the routing policies generated by the relay 1 to the relay 8 into a full routing table. Certainly, the set routing table and the supplementary routing table can also be formed separately, which are not described in detail herein.

Step 306: transmit the blockchain message to the target blockchain node through the target relay node.

After the relay node determines the target relay node, if the relay node pertains to the target relay node, the relay node transmits the blockchain message to the target blockchain node based on the target blockchain node connected to the relay node. If the relay node is not the target relay node, or there is other target relay node(s) besides the relay node, the relay node transmits the blockchain message to the target relay node, for the target relay node to forward the blockchain message to the connected target blockchain node. When the relay node transmits the blockchain message to the target relay node, if the relay node is directly connected to the target relay node, the blockchain message can be directly transmitted to the target relay node. If the relay node is not directly connected to the target relay node, the relay node can plan a transmission path between the relay node and the target relay node, and send the blockchain message to a relay node at a next hop in the transmission path, for the blockchain message to reach the target relay node along the transmission path.

In addition to realizing the transmission of the blockchain message by defining the routing policy using the blockchain node set, more direct message transmission can also be realized between blockchain nodes. Compared with the transmission mode based on the blockchain node set, a difference between the two lies in how to indicate a target object in the blockchain message when the blockchain node generates the blockchain message. Therefore, when the relay node receives a blockchain message sent for any blockchain node, a relay node in the blockchain relay communication network and connected to the any blockchain node can be determined and the blockchain message can be transmitted to the any blockchain node through the determined relay node. For example, in the embodiment shown in FIG. 5, by defining the target object as a blockchain node set "CID1/SID2/Role1" in the blockchain message, the node 23 can be referred to as the actual target blockchain node, but another way can also be adopted: directly defining the target object as a node ID "Node3" of the node 23 in the blockchain message. When the node ID of the blockchain node is directly added to the blockchain message, the node ID of one or more blockchain nodes can be added, that is, the number of the any blockchain node is not limited. Generally, especially when there are a large number of blockchain nodes or members in the blockchain node set change frequently, the routing policy is defined by using the blockchain node set, which can reduce a complexity of the blockchain message.

Certainly, no matter whether the blockchain node set or the specific blockchain node is indicated in the blockchain message, the technical solution of this specification can make the relay node in the blockchain relay communication network realize targeted message transmission in the process of transmitting the blockchain message, which aims to transmit the blockchain message to the target relay node and then transmit the blockchain message from the target relay node to the blockchain node taking as the target object, without generating unnecessary data interaction between the relay nodes or between the relay nodes and the blockchain nodes. Thus eliminating a blindness of message transmission based on the P2P technology in the related art, accelerating a transmission speed of the blockchain message, and reducing resource consumption of the blockchain relay communication network.

Figure 7:
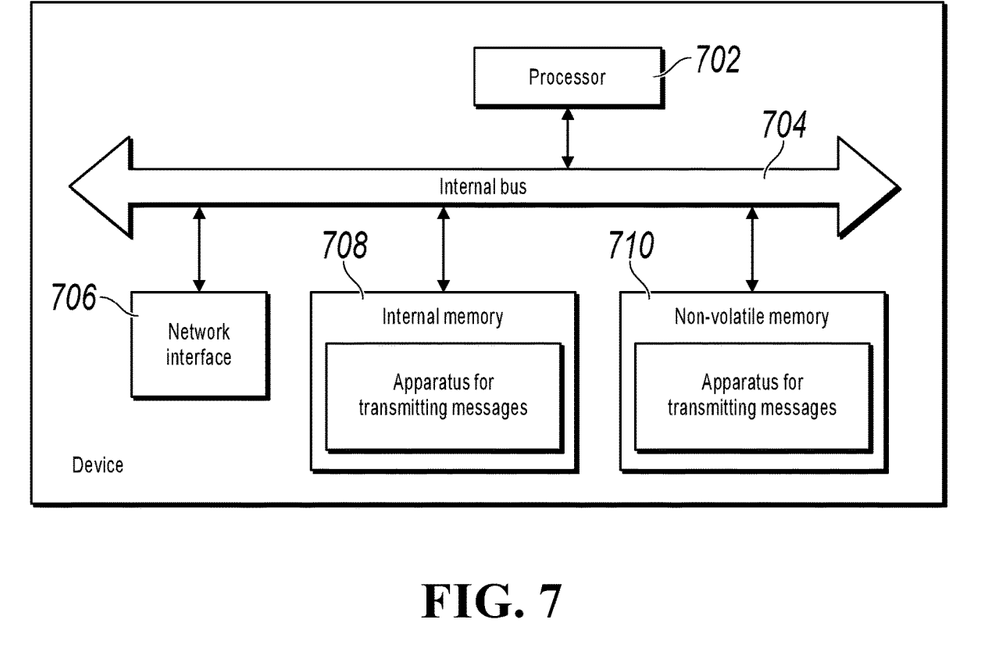
FIG. 7 is a schematic structural diagram of a device, according to an explanatory embodiment.

FIG. 7 is a schematic structural diagram of a device, according to an explanatory embodiment. Referring to FIG. 7, at a hardware level, the device includes a processor 702, an internal bus 704, a network interface 706, an internal memory 708, and a non-volatile memory 710, and certainly can further include hardware required for other services. The processor 702 reads a corresponding computer program from the non-volatile memory 710 into the internal memory 708 and then executes the computer program, to form a message transmission apparatus at a logic level. Certainly, in addition to a software implementation, one or more embodiments of this specification do not exclude other implementations, for example, logic devices or a software-hardware combination. That is, execution bodies of the following processing procedures are not limited to logic units and can alternatively be hardware or logic devices.

Figure 8:
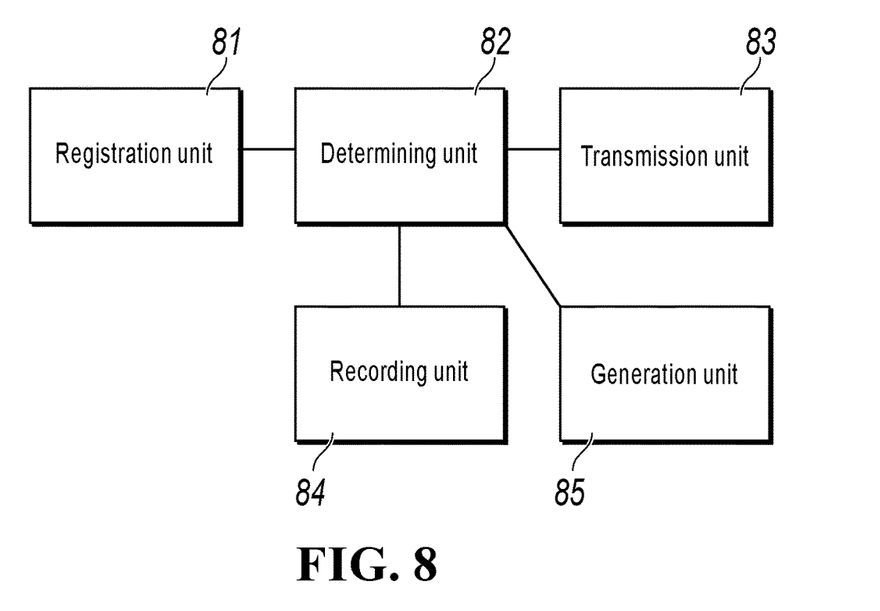
FIG. 8 is a block diagram of an apparatus for transmitting messages, according to an explanatory embodiment.

Referring to FIG. 8, in a software implementation, the apparatus for transmitting messages can include: a registration unit 81, configured to register, based on a registration request submitted by each blockchain node, the blockchain node to a blockchain node set indicated by the registration request; a determining unit 82, configured to determine, when receiving a blockchain message sent for a target blockchain node set, a target blockchain node registered to the target blockchain node set and a target relay node in the blockchain relay communication network and connected to the target blockchain node; and a transmission unit 83, configured to transmit the blockchain message to the target blockchain node through the target relay node.

Optionally, the registration unit 81 is specifically configured to: register, in a case that the registration request includes a set identifier, the blockchain node initiating the registration request to a blockchain node set corresponding to the set identifier; and register, in a case that the registration request does not include a set identifier, the blockchain node initiating the registration request to a default blockchain node set.

Optionally, the default blockchain node set includes all blockchain nodes in a blockchain network to which the blockchain node initiating the registration request pertains.

Optionally, the determining unit 82 is specifically configured to: receive the blockchain message sent for the target blockchain node set from a connected blockchain node; or, receive the blockchain message sent for the target blockchain node set from other relay node(s) in the blockchain relay communication network.

Optionally, the determining unit 82 is specifically configured to: read a set identifier from the blockchain message after receiving the blockchain message; and determine a blockchain node set corresponding to the set identifier as the target blockchain node set corresponding to the blockchain message.

Optionally, the apparatus further includes: a recording unit 84, configured to record, based on role type information included in the registration request, a role type corresponding to each blockchain node in the blockchain node set to which the blockchain node pertains; and the determining unit 82 is specifically configured to: read a target role type indicated in the blockchain message and take the blockchain node registered to the target blockchain node set and corresponding to the target role type as the target blockchain node.

Optionally, the apparatus further includes: a generation unit 85, configured to generate a routing table, where the routing table is used for recording the blockchain node set to which each blockchain node pertains and a connection relationship between each blockchain node and the relay nodes; and the determining unit 82 is specifically configured to: determine, by querying the routing table, the target blockchain node registered to the target blockchain node set and the target relay node in the blockchain relay communication network and connected to the target blockchain node.

Optionally, the transmission unit 83 is specifically configured to: transmit the blockchain message to the connected target blockchain node; and/or, transmit the blockchain message to the target relay node, for the target relay node to forward the blockchain message to the connected target blockchain node.

Optionally, the transmission unit 83 is further configured to: determine, when receiving a blockchain message sent for any blockchain node, a relay node in the blockchain relay communication network and connected to the any blockchain node and transmit the blockchain message to the any blockchain node through the determined relay node.

Optionally, the blockchain node set indicated by the registration request is irrelevant to other blockchain node set(s); or, the blockchain node set indicated by the registration request is included in one or more other blockchain node sets; or, the blockchain node set indicated by the registration request includes one or more other blockchain node sets.

The system, the apparatus, the module or the unit described in the previously described embodiments can be implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which can implement storage of information by using any method or technology. The information can be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. Based on limitations of this specification, the computer-readable medium does not include transitory computer-readable media (transitory media), such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Without further limitation, the element defined by a phrase "include one" does not exclude other same elements in the process, method, product or device which include the element.

Embodiments of this specification are described above. Other embodiments fall within the scope of the appended claims. In some cases, the actions or steps recorded in the claims can be performed in sequences different from those in the embodiments and an expected result can still be achieved. In addition, the processes depicted in the accompanying drawings are not necessarily performed in the specific order or successively to achieve an expected result. In some embodiments, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previously described descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
   determining, as a result, whether a blockchain registration request sent by a blockchain node in a blockchain relay communication network comprises a set identifier;
   in response to the result being TRUE, registering the blockchain node to a blockchain node set corresponding to the set identifier;
   in response to the result being FALSE, registering the blockchain node to a default blockchain node set comprising all blockchain nodes in the blockchain relay communication network to which the blockchain node pertains;
   determining, in response to receiving a blockchain message to be sent to a target blockchain node set of the blockchain relay communication network, a target blockchain node registered to the target blockchain node set and a target relay node in the blockchain relay communication network; and
   transmitting the blockchain message to the target blockchain node through the target relay node.

2. The computer-implemented method according to claim 1, wherein receiving the blockchain message sent for the target blockchain node set, comprises at least one of:
   (i) receiving the blockchain message sent for the target blockchain node set from a connected blockchain node, or
   (ii) receiving the blockchain message sent for the target blockchain node set from one or more other relay nodes in the blockchain relay communication network.

3. The computer-implemented method according to claim 1, wherein receiving the blockchain message sent for the target blockchain node set comprises:
   identifying a set identifier from the blockchain message after receiving the blockchain message; and
   determining a blockchain node set corresponding to the set identifier as the target blockchain node set corresponding to the blockchain message.

4. The computer-implemented method according to claim 1, comprising:
   recording, based on role type information comprised in the blockchain registration request, a role type corresponding to each blockchain node in the blockchain node set to which the blockchain node pertains; and
   wherein determining the target blockchain node registered to the target blockchain node set comprises:
      identifying a target role type indicated in the blockchain message; and
      taking a blockchain node registered to the target blockchain node set and corresponding to the target role type as the target blockchain node.

5. The computer-implemented method according to claim 1, comprising:
   generating a routing table configured to record a blockchain node set to which each blockchain node pertains and a connection relationship between each blockchain node and relay nodes; and
   wherein determining the target blockchain node registered to the target blockchain node set and the target relay node in the blockchain relay communication network and connected to the target blockchain node comprises:
      determining, by querying the routing table, the target blockchain node registered to the target blockchain node set and the target relay node in the blockchain relay communication network and connected to the target blockchain node.

6. The computer-implemented method according to claim 1, wherein transmitting the blockchain message to the target blockchain node through the target relay node, comprises at least one of:
   (i) transmitting the blockchain message to the target blockchain node connected to the target relay node; or
   (ii) transmitting the blockchain message to the target relay node, for the target relay node to forward the blockchain message to the target blockchain node connected to the target relay node.

7. The computer-implemented method according to claim 1, comprising:
   determining, when receiving a blockchain message sent for a blockchain node in the blockchain relay communication network, a relay node in the blockchain relay communication network and connected to the blockchain node and transmitting the blockchain message to the blockchain node through the relay node.

8. The computer-implemented method according to claim 1, wherein the blockchain node set indicated by the blockchain registration request is one of:
   (i) irrelevant to one or more of other blockchain node sets,
   (ii) comprised in one or more other blockchain node sets, or
   (iii) the blockchain node set indicated by the blockchain registration request comprises one or more other blockchain node sets.

9. A non-transitory, computer-readable medium storing one or more instructions executable by a computer system to perform operations comprising:
   determining, as a result, whether a blockchain registration request sent by a blockchain node in a blockchain relay communication network comprises a set identifier;
   in response to the result being TRUE, registering the blockchain node to a blockchain node set corresponding to the set identifier;
   in response to the result being FALSE, registering the blockchain node to a default blockchain node set comprising all blockchain nodes in the blockchain relay communication network to which the blockchain node pertains;
   determining, in response to receiving a blockchain message to be sent to a target blockchain node set of the blockchain relay communication network, a target blockchain node registered to the target blockchain node set and a target relay node in the blockchain relay communication network; and
   transmitting the blockchain message to the target blockchain node through the target relay node.

10. The non-transitory, computer-readable medium according to claim 9, wherein receiving the blockchain message sent for the target blockchain node set, includes at least one operation comprising:

(i) receiving the blockchain message sent for the target blockchain node set from a connected blockchain node, or (ii) receiving the blockchain message sent for the target blockchain node set from one or more other relay nodes in the blockchain relay communication network.

11. The non-transitory, computer-readable medium according to claim 9, wherein receiving the blockchain message sent for the target blockchain node set, the operations comprising:

identifying a set identifier from the blockchain message after receiving the blockchain message; and determining a blockchain node set corresponding to the set identifier as the target blockchain node set corresponding to the blockchain message.

12. The non-transitory, computer-readable medium according to claim 9, the operations comprising:

recording, based on role type information comprised in the blockchain registration request, a role type corresponding to each blockchain node in the blockchain node set to which the blockchain node pertains; and wherein determining the target blockchain node registered to the target blockchain node set includes operations comprising:

identifying a target role type indicated in the blockchain message; and taking a blockchain node registered to the target blockchain node set and corresponding to the target role type as the target blockchain node.

13. The non-transitory, computer-readable medium according to claim 9, the operations comprising:

generating a routing table configured to record a blockchain node set to which each blockchain node pertains and a connection relationship between each blockchain node and relay nodes; and wherein determining the target blockchain node registered to the target blockchain node set and the target relay node in the blockchain relay communication network and connected to the target blockchain node includes operations comprises:

determining, by querying the routing table, the target blockchain node registered to the target blockchain node set and the target relay node in the blockchain relay communication network and connected to the target blockchain node.

14. The non-transitory, computer-readable medium according to claim 9, wherein transmitting the blockchain message to the target blockchain node through the target relay node, the operations comprise at least one of:

(i) transmitting the blockchain message to the target blockchain node connected to the target relay node; or (ii) transmitting the blockchain message to the target relay node, for the target relay node to forward the blockchain message to the target blockchain node connected to the target relay node.

15. The non-transitory, computer-readable medium according to claim 9, the operations comprising:

determining, when receiving a blockchain message sent for a blockchain node in the blockchain relay communication network, a relay node in the blockchain relay communication network and connected to the blockchain node and transmitting the blockchain message to the blockchain node through the relay node.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

determining, as a result, whether a blockchain registration request sent by a blockchain node in a blockchain relay communication network comprises a set identifier;

in response to the result being TRUE, registering the blockchain node to a blockchain node set corresponding to the set identifier;

in response to the result being FALSE, registering the blockchain node to a default blockchain node set comprising all blockchain nodes in the blockchain relay communication network to which the blockchain node pertains;

determining, in response to receiving a blockchain message to be sent to a target blockchain node set of the blockchain relay communication network, a target blockchain node registered to the target blockchain node set and a target relay node in the blockchain relay communication network; and transmitting the blockchain message to the target blockchain node through the target relay node.

17. The computer-implemented system according to claim 16, wherein receiving the blockchain message sent for the target blockchain node set, includes one or more operations comprising at least one of:

(i) receiving the blockchain message sent for the target blockchain node set from a connected blockchain node, or (ii) receiving the blockchain message sent for the target blockchain node set from one or more other relay nodes in the blockchain relay communication network.

18. The computer-implemented system, according to claim 16, wherein receiving the blockchain message sent for the target blockchain node set includes one or more operations comprising:

identifying a set identifier from the blockchain message after receiving the blockchain message; and determining a blockchain node set corresponding to the set identifier as the target blockchain node set corresponding to the blockchain message.

19. The computer-implemented system according to claim 16, the operations comprising:

generating a routing table configured to record a blockchain node set to which each blockchain node pertains and a connection relationship between each blockchain node and relay nodes; and wherein determining the target blockchain node registered to the target blockchain node set and the target relay node in the blockchain relay communication network and connected to the target blockchain node comprises:

determining, by querying the routing table, the target blockchain node registered to the target blockchain node set and the target relay node in the blockchain relay communication network and connected to the target blockchain node.

20. The computer-implemented system according to claim 16, wherein transmitting the blockchain message to the target blockchain node through the target relay node, includes one or more operations comprising at least one of:

(i) transmitting the blockchain message to the target blockchain node connected to the target relay node; or (ii) transmitting the blockchain message to the target relay node, for the target relay node to forward the blockchain message to the target blockchain node connected to the target relay node.

* * * * *